(12) United States Patent
Sauerlaender et al.

(10) Patent No.: US 8,629,622 B2
(45) Date of Patent: Jan. 14, 2014

(54) LIGHT EMITTING DIODE CIRCUIT

(75) Inventors: Georg Sauerlaender, Aachen (DE); Carsten Deppe, Aachen (DE)

(73) Assignee: Koninklijke Philips N.V., Eindhoven (NL)

( * ) Notice: Subject to any disclaimer, the term of this patent is extended or adjusted under 35 U.S.C. 154(b) by 138 days.

(21) Appl. No.: 13/391,646

(22) PCT Filed: Sep. 1, 2010

(86) PCT No.: PCT/IB2010/053917
§ 371 (c)(1),
(2), (4) Date: Feb. 22, 2012

(87) PCT Pub. No.: WO2011/027299
PCT Pub. Date: Mar. 10, 2011

(65) Prior Publication Data
US 2012/0146544 A1     Jun. 14, 2012

(30) Foreign Application Priority Data

Sep. 4, 2009  (EP) ..................................... 09169471

(51) Int. Cl.
*H05B 37/00* (2006.01)
(52) U.S. Cl.
USPC ...................... 315/192; 315/185 R
(58) Field of Classification Search
USPC ...................... 315/192, 185 R, 291
See application file for complete search history.

(56) References Cited

U.S. PATENT DOCUMENTS

| | | | | |
|---|---|---|---|---|
| 7,528,553 B2 * | 5/2009 | Ito et al. | ......................... | 315/291 |
| 8,120,201 B2 * | 2/2012 | Fujino | ......................... | 307/10.8 |
| 2011/0227490 A1 * | 9/2011 | Huynh | ..................... | 315/185 R |
| 2011/0309757 A1 * | 12/2011 | Weaver et al. | ................. | 315/188 |
| 2012/0235589 A1 * | 9/2012 | Slot et al. | ...................... | 315/210 |
| 2013/0009546 A1 * | 1/2013 | Hollander | ..................... | 315/113 |
| 2013/0147380 A1 * | 6/2013 | Chobot | ......................... | 315/210 |
| 2013/0207559 A1 * | 8/2013 | Ferrier | .......................... | 315/192 |

FOREIGN PATENT DOCUMENTS

| | | |
|---|---|---|
| DE | 10358447 B3 | 5/2005 |
| DE | 102006024607 A1 | 11/2007 |
| EP | 0967590 A1 | 12/1999 |
| WO | 2009004563 A1 | 1/2009 |
| WO | 2009013675 A1 | 1/2009 |

* cited by examiner

*Primary Examiner* — Don Le
(74) *Attorney, Agent, or Firm* — Mark L. Beloborodov

(57) ABSTRACT

In light emitting diode circuits (1) comprising serially coupled first and second circuits (11, 12) with first and second light emitting diodes, third circuits (13) are coupled in parallel with the second circuits (12) for controlling the first light emitting diodes in the first circuits (11) and/or third light emitting diodes in fourth circuits (14). This allows more options, more optimizations, more flexibility and/or more efficiency. The light emitting diode circuit (1) receives a supply voltage from a source (2, 3) for feeding the light emitting diode circuit (1). The third circuit (13) receives a feeding voltage from the second circuit (12) for feeding the third circuit (13). The feeding voltage may be a voltage present across the second circuit (12). The third circuit (13) may further control the second light emitting diodes in the second circuit (12). Said controlling may comprise controlling a current flowing through said light emitting diodes for the purpose of dimming, flicker suppression, color control and/or temperature protection.

13 Claims, 5 Drawing Sheets

LIGHT EMITTING DIODE CIRCUIT

FIELD OF THE INVENTION

The invention relates to a light emitting diode circuit. The invention further relates to a device comprising such a light emitting diode circuit.

Examples of such a device are lamps with light emitting diodes.

BACKGROUND OF THE INVENTION

WO 2009/013675 discloses a self-powered light emitting diode bypass-switch configuration, wherein a light emitting diode string is divided into segments that each have a bypass-switch and a driver for the bypass-switch. The driver is powered by a supply voltage locally generated from the forward-voltages of the light emitting diodes of the segment.

SUMMARY OF THE INVENTION

Objects of the invention are to provide an improved light emitting diode circuit and to provide a device comprising an improved light emitting diode circuit.

According to a first aspect of the invention, a light emitting diode circuit is provided comprising
- a first circuit comprising at least a first light emitting diode unit,
- a second circuit comprising at least a second light emitting diode unit, and
- a third circuit for controlling at least one light emitting diode unit different from the second light emitting diode unit, the third circuit being coupled in parallel with the second circuit, and the second circuit being coupled in series with the first circuit.

The light emitting diode circuit comprises a first circuit with a first light emitting diode unit and a second circuit with a second light emitting diode unit. The first and the second circuit are coupled in series with each other. The light emitting diode circuit further comprises a third circuit. The third circuit is coupled in parallel with the second circuit and controls at least one light emitting diode unit that is located outside the second circuit. As a result, it is no longer necessary to use, for each segment of a light emitting diode string, and for each driver of each segment, a locally generated supply voltage for powering the driver. With the first aspect of the invention, a light emitting diode circuit can be divided into first and second circuits, wherein one third circuit can be located at one out of many locations (more options, more optimizations) and can be used for controlling other, more and/or all circuits (more flexibility, more efficiency). These are great improvements.

According to an embodiment, the light emitting diode circuit is defined by the light emitting diode circuit being arranged for receiving a supply voltage from a source for feeding the light emitting diode circuit, and the third circuit being arranged for receiving a feeding voltage from the second circuit for feeding the third circuit. The source may be an alternating current source for providing an alternating current supply voltage and may be an alternating current source with a rectifying arrangement for providing a direct current supply voltage and may be a direct current source for providing a direct current supply voltage.

According to an embodiment, the light emitting diode circuit is defined by the feeding voltage being a voltage present across the second circuit. This is a simple and low-cost embodiment.

According to an embodiment, the light emitting diode circuit is defined by the third circuit comprising feeding terminals coupled to ending terminals of the second circuit. This is a simple and low-cost embodiment that is easy to realize.

According to an embodiment, the light emitting diode circuit is defined by said at least one light emitting diode unit comprising said first light emitting diode unit and/or a third light emitting diode unit of a fourth circuit of the light emitting diode circuit. The third circuit may control the first light emitting diode unit in the first circuit and/or may control a third light emitting diode unit in a fourth circuit. This fourth circuit may be coupled in series with the first and/or the second circuit or may be coupled in parallel with the first circuit or to a combination of the first and the second circuit etc.

According to an embodiment, the light emitting diode circuit is defined by the third circuit being arranged for further controlling at least the second light emitting diode unit. The third circuit may control, in addition to controlling the first light emitting diode unit and/or the third light emitting diode circuit, the second light emitting diode unit in the second circuit. This is an efficient embodiment.

According to an embodiment, the light emitting diode circuit is defined by said controlling comprising controlling a current flowing through said at least one light emitting diode unit for the purpose of dimming, flicker suppression, color control and/or temperature protection. The current may be controlled via a controlling arrangement coupled in series with or in parallel with said at least one light emitting diode unit.

According to an embodiment, the light emitting diode circuit is defined by the third circuit comprising a transistor, an operational amplifier, a comparator, a sensor, analog circuitry, digital circuitry and/or a processor. Such arrangements or elements often require a feeding voltage that is much smaller than the supply voltage.

According to an embodiment, the light emitting diode circuit is defined by the first circuit further comprising one or more further first light emitting diode units and/or one or more other units, and/or the second circuit further comprising one or more further second light emitting diode units and/or one or more other units, and/or the light emitting diode circuit further comprising one or more other units. Said light emitting diode units each comprise one or more light emitting diodes. Said other units are not light emitting diode units and are coupled in series with and/or in parallel with the light emitting diode units. Said other units may be resistors, current sources, controlling arrangements, other arrangements and other elements.

According to an embodiment, the light emitting diode circuit is defined by one or more of the light emitting diode units, each diode unit comprising or forming part of anti-parallel light emitting diodes wherein the third circuit is coupled in parallel with the second circuit via a rectifying circuit, or one or more of the light emitting diode units, each diode unit comprising or forming part of uni-directional light emitting diodes wherein the third circuit is coupled in parallel with the second circuit via a connection. In case of an alternating current supply voltage, anti-parallel light emitting diodes may be used and a rectifying circuit such as one diode or two diodes or a diode bridge with four diodes etc. may be used for converting the alternating current voltage across the second circuit into a direct current feeding voltage for the third circuit. In case of a direct current supply voltage, uni-directional light emitting diodes may be used and a simple connection may be used for transporting the direct current voltage across the second circuit to the third circuit as a direct current feeding voltage.

According to an embodiment, the light emitting diode circuit is defined by the third circuit forming part of a converter for feeding the first and the second circuit. Here a converter and the third circuit are combined, which makes this embodiment a highly efficient embodiment.

According to an embodiment, the light emitting diode circuit is defined by the third circuit forming part of a control of the converter, or by this control forming part of the third circuit. The converter feeds the first and the second circuit. A control of the converter is fed via the second circuit. This control comprises or forms part of the third circuit.

According to a second aspect of the invention, a device is provided comprising a light emitting diode circuit as defined above.

The invention is based on the-insight that fully self-supporting segments are an expensive solution. The invention is based on a basic idea that, in a light emitting diode circuit comprising serially coupled first and second circuits with first and second light emitting diode units, a third circuit should be coupled in parallel with the second circuit and should control at least one light emitting diode unit that is located outside the second circuit.

The invention has solved the problem of providing an improved light emitting diode circuit. The invention is further advantageous in that more options, more optimizations, more flexibility and/or more efficiency have become possible.

These and other aspects of the invention are apparent from and will be elucidated with reference to the embodiment(s) described hereinafter.

DETAILED DESCRIPTION OF EMBODIMENTS

Figure 1:
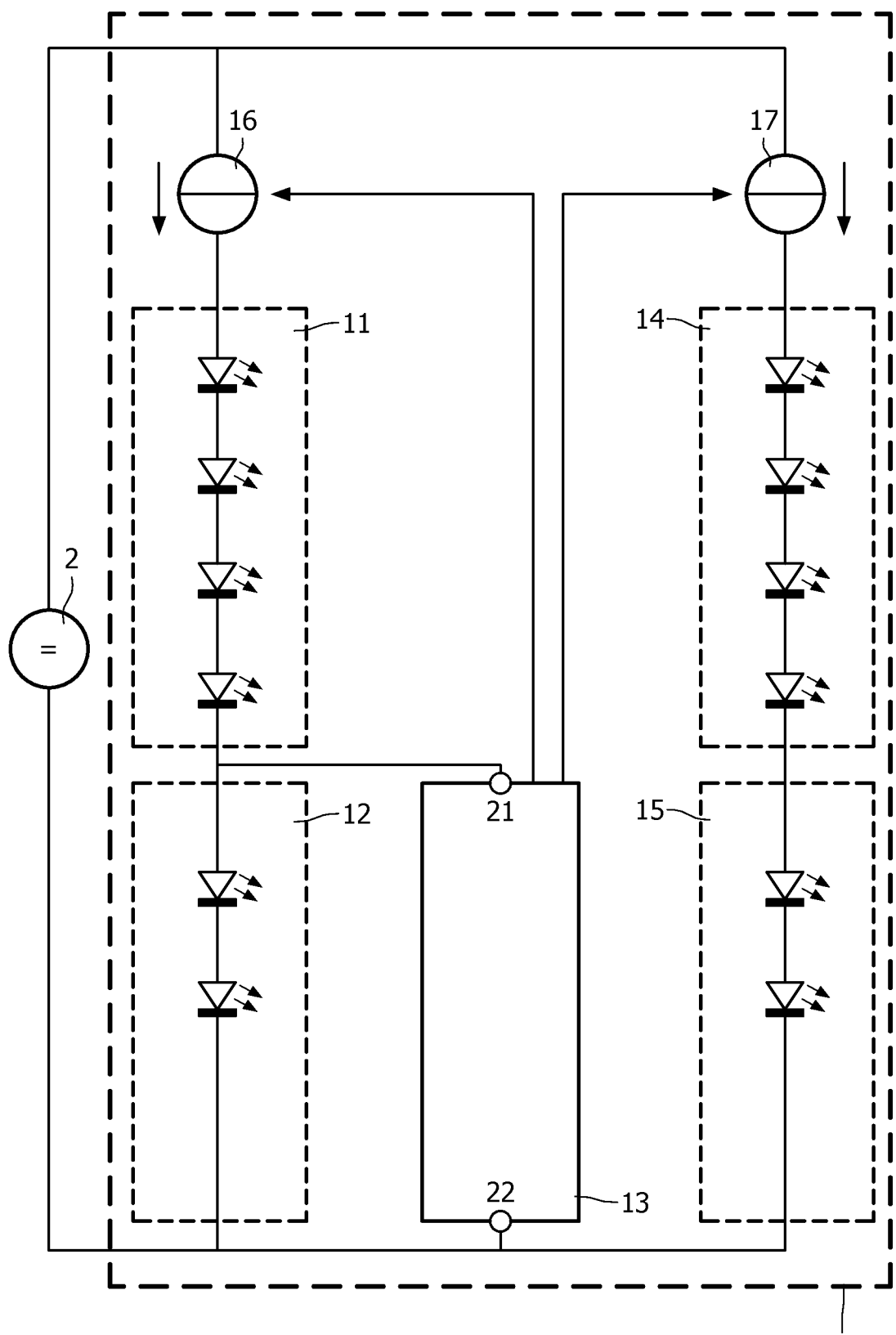
FIG. 1 shows a first light emitting diode circuit.

In the FIG. 1, a first light emitting diode circuit 1 is shown comprising a first serial connection of a current source 16, a first circuit 11 and a second circuit 12 and comprising a second serial connection of a current source 17, a fourth circuit 14 and a fifth circuit 15. The first and fourth circuit 11 and 14 each comprise four serial light emitting diodes. The second and fifth circuit 12 and 15 each comprise two serial light emitting diodes. The first and the second serial connections are connected in parallel with each other and to a direct current voltage source 2 for feeding the light emitting diode circuit 1. The light emitting diode circuit 1 further comprises a third circuit 13 for controlling at least one light emitting diode in at least the first circuit 11 or the fourth circuit 14. Preferably, the third circuit 13 controls each light emitting diode in at least the first circuit 11 or the fourth circuit 14, or controls at least one light emitting diode in each one of the first, second, fourth and fifth circuits 11, 12, 14 and 15. Most preferably, the third circuit 13 controls each light emitting diode in each one of the first, second, fourth and fifth circuits 11, 12, 14 and 15.

The third circuit 13 is arranged for receiving a feeding voltage from the second circuit 12 for feeding the third circuit 13. Preferably, this feeding voltage is a voltage present across the second circuit 12. For this reason, the third circuit 13 may be provided with feeding terminals 21 and 22 coupled to ending terminals of the second circuit 12. The third circuit 13 for example comprises a transistor, an operational amplifier, a comparator, a sensor, analog circuitry, digital circuitry and/or a processor etc.

In the first light emitting diode circuit 1 as shown in the FIG. 1, said controlling comprises a control of a current flowing through said at least one light emitting diode for example for the purpose of dimming, flicker suppression, color control and/or temperature protection etc. For this reason, outputs of the third circuit 13 are linked to control inputs of the current sources 16 and 17.

In a practical implementation, it might be a better choice to locate the current source 16 between the first circuit 11 and the second circuit 12, above feeding terminal 21. In the optional second string, the current source 17 could be placed below the fifth circuit 15 or between the fourth circuit 14 and the fifth circuit 15.

Alternatively, each one of the first, second, fourth and fifth circuits 11, 12, 14 and 15 may comprise another number of light emitting diodes in any kind of serial and/or parallel connection. In a minimum situation, only the first and the second circuit 11 and 12 will be present. A sixth circuit not shown etc. added to the first, second, fourth and fifth circuit 11, 12, 14 and 15 in any kind of serial and/or parallel connection is not to be excluded. Both current sources 16 and 17 may be combined into one current source and/or may be replaced by other serial controlling arrangements such as for example switchable passive elements etc.

Figure 2:
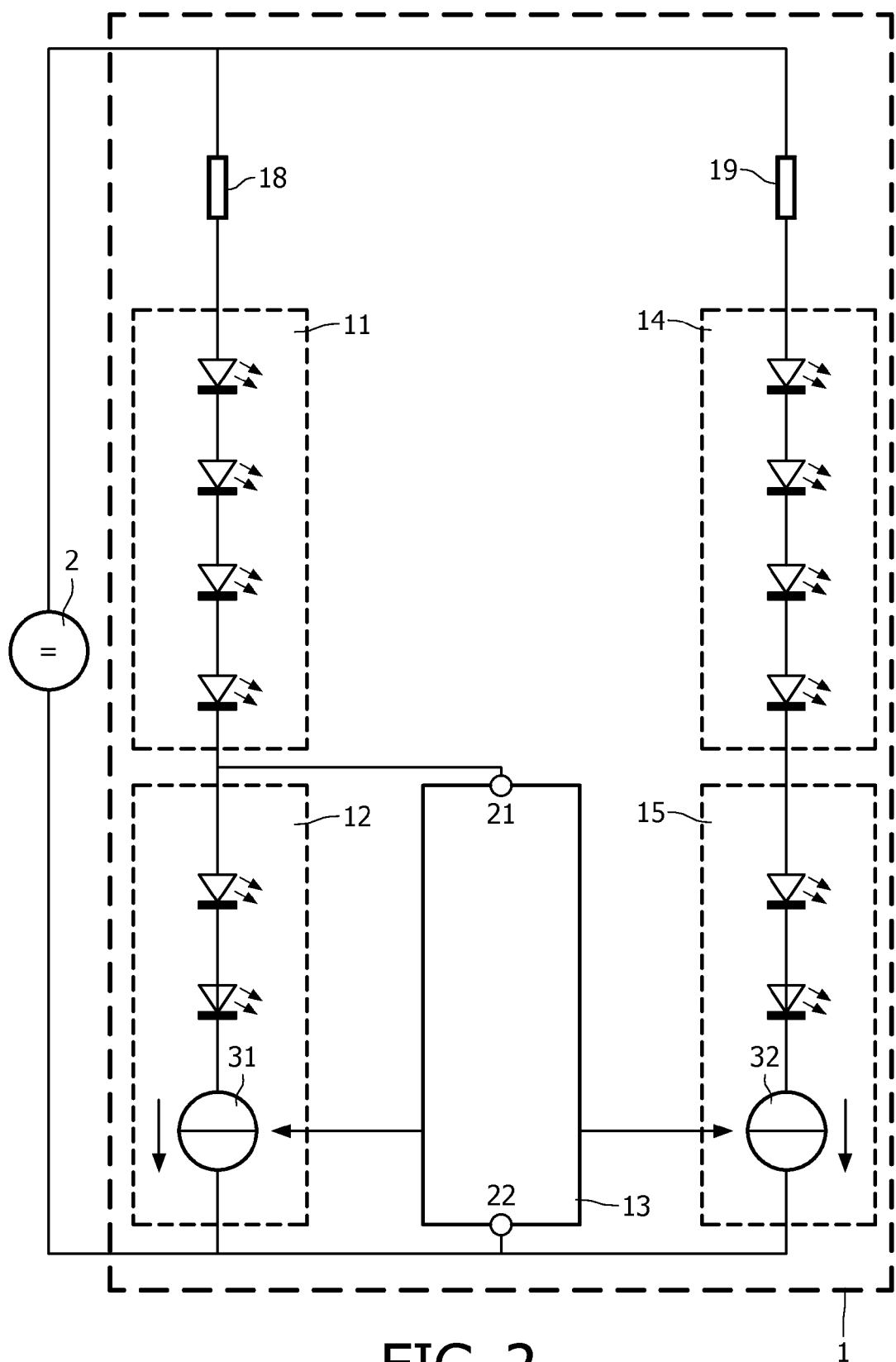
FIG. 2 shows a second light emitting diode circuit.

In the FIG. 2, a second light emitting diode circuit 1 is shown that only differs from the one shown in the FIG. 1 in that the current sources 16 and 17 have been replaced by resistors 18 and 19 and in that the second and fifth circuit 12 and 15 have current sources 31 and 32 connected in series with the two light emitting diodes and controlled by the third circuit 13.

Figure 3:
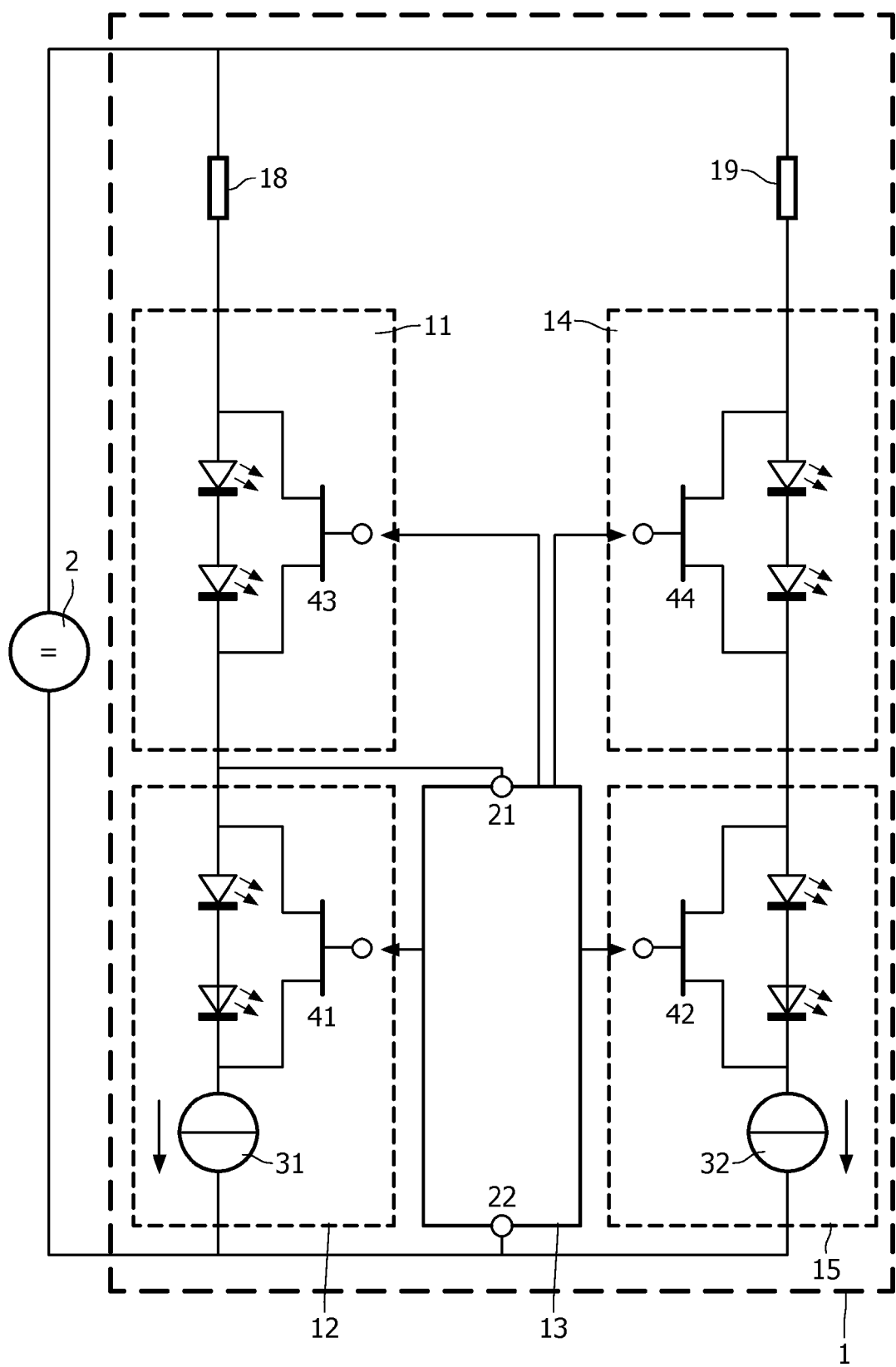
FIG. 3 shows a third light emitting diode circuit.

In the FIG. 3, a third light emitting diode circuit 1 is shown that only differs from the one shown in the FIG. 2 in that the first and fourth circuit 11 and 14 each comprise two serial light emitting diodes and in that in the first (second, fourth, fifth) circuit 11 (12, 14, 15) the two serial light emitting diodes can be bridged via a transistor 43 (41, 44, 42). The transistors 41-44 are controlled by the third circuit 13. For this reason outputs of the third circuit 13 are linked to control electrodes of these transistors 41-44.

Alternatively, each one of the first, second, fourth and fifth circuits 11, 12, 14 and 15 may comprise another number of light emitting diodes in any kind of serial and/or parallel connection. In a minimum situation, only one transistor per circuit may be present. In a more advanced situation, more than one transistor may be present per circuit. In a maximum situation, a transistor per light emitting diode may be used. The current sources 31 and 32 may be controlled by the third circuit 13 as well. A sixth circuit not shown etc. added to the first, second, fourth and fifth circuit 11, 12, 14 and 15 in any kind of serial and/or parallel connection is not to be excluded. Both current sources 31 and 32 may be combined into one current source and/or may be replaced by other serial controlling arrangements such as for example switchable passive elements etc. Each transistor 41-44 may be replaced by another parallel controlling arrangement such as for example a switchable passive element etc.

Figure 4:
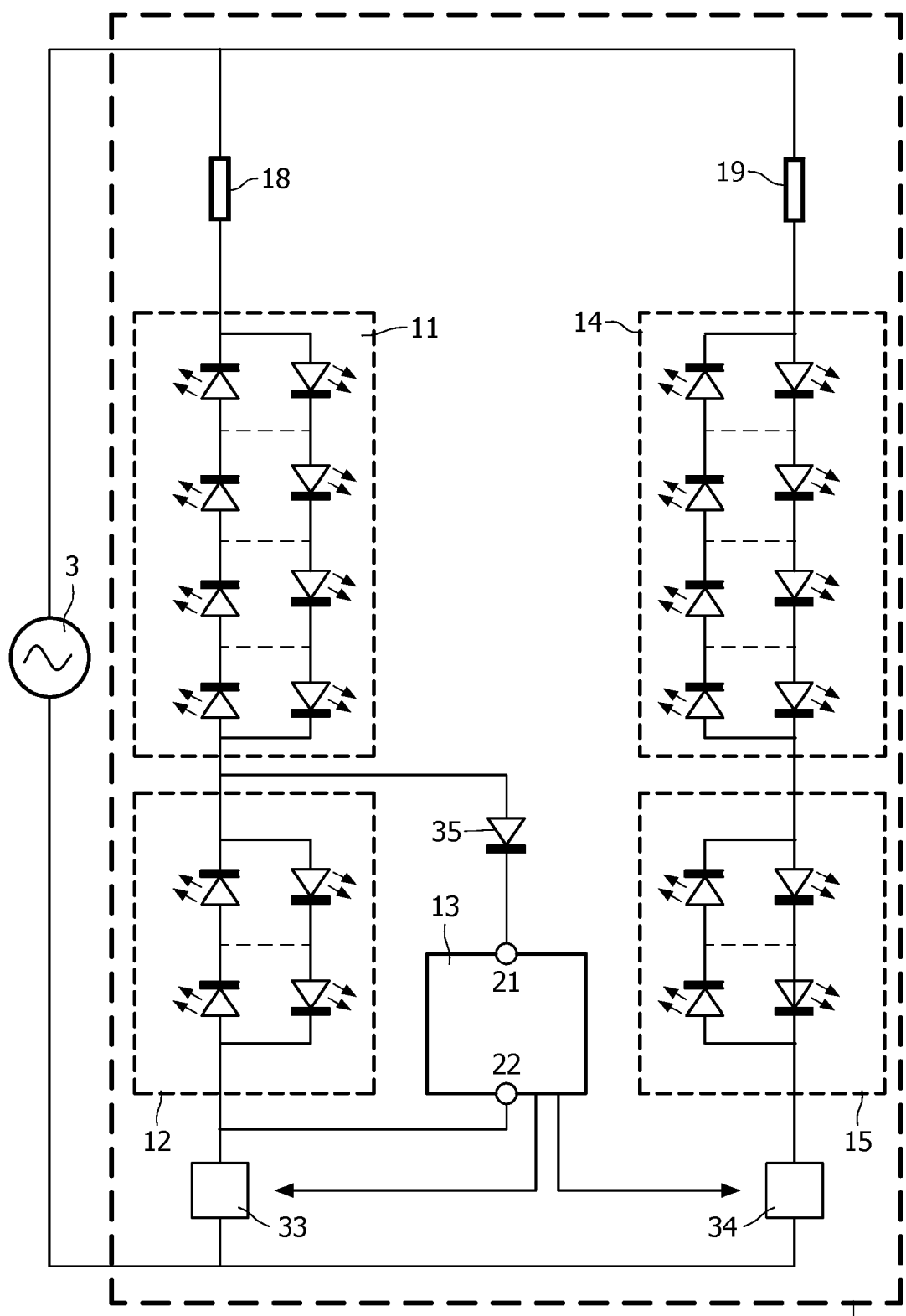
FIG. 4 shows a fourth light emitting diode circuit.

In the FIG. 4, a fourth light emitting diode circuit 1 is shown comprising a first serial connection of a resistor 18, a first circuit 11, a second circuit 12 and a first serial controlling arrangement 33 and comprising a second serial connection of a resistor 19, a fourth circuit 14, a fifth circuit 15 and a second serial controlling arrangement 34. The first and fourth circuit 11 and 14 each comprise four pairs of anti-parallel light emitting diodes or two anti-parallel strings each with four serial light emitting diodes. The second and fifth circuit 12 and 15 each comprise two pairs of anti-parallel light emitting diodes or two anti-parallel strings each with two serial light emitting diodes. The first and the second serial connections are connected in parallel with each other and to an alternating current voltage source 3 for feeding the light emitting diode circuit 1. The light emitting diode circuit 1 further comprises a third circuit 13 for controlling at least one light emitting diode in at least the first circuit 11 or the fourth circuit 14. Preferably, the third circuit 13 controls each light emitting diode in at least the first circuit 11 or the fourth circuit 14, or controls at least one light emitting diode in each one of the first, second, fourth and fifth circuits 11, 12, 14 and 15. Most preferably, the third circuit 13 controls each light emitting diode in each one of the first, second, fourth and fifth circuits 11, 12, 14 and 15.

The third circuit 13 is arranged for receiving a feeding voltage from the second circuit 12 for feeding the third circuit 13. Preferably, this feeding voltage is a voltage present across the second circuit 12. For this reason, the third circuit 13 may be provided with a feeding terminal 21 coupled to an upper terminal of the second circuit 12 via a rectifying circuit 35 and with a feeding terminal 22 coupled to a lower terminal of the second circuit 12. The third circuit 13 for example comprises a transistor, an operational amplifier, a comparator, a sensor, analog circuitry, digital circuitry and/or a processor etc. that usually requires a direct current voltage. The rectifying circuit 35 may be a diode. Alternatively, two diodes or a diode bridge with four diodes may be used. Further alternatively, the rectifying circuit 35 may be shifted into the third circuit 13.

In the fourth light emitting diode circuit 1 as shown in the FIG. 4, said controlling comprises a control of a current flowing through said at least one light emitting diode for example for the purpose of dimming, flicker suppression, color control and/or temperature protection etc. For this reason, outputs of the third circuit 13 are linked to control inputs of the serial controlling arrangements 33 and 34.

Alternatively, each one of the first, second, fourth and fifth circuits 11, 12, 14 and 15 may comprise another number of light emitting diodes in any kind of serial and/or parallel connection. In a minimum situation, only the first and the second circuit 11 and 12 will be present. A sixth circuit not shown etc. added to the first, second, fourth and fifth circuit 11, 12, 14 and 15 in any kind of serial and/or parallel connection is not to be excluded. Both serial controlling arrangements 33 and 34 may be combined into one serial controlling arrangement and/or may be replaced and/or extended with parallel controlling arrangements described above etc. Both serial controlling arrangements 33 and 34 may replace said resistors 18 and 19 or may be located closer to these resistors 18 and 19.

Figure 5:
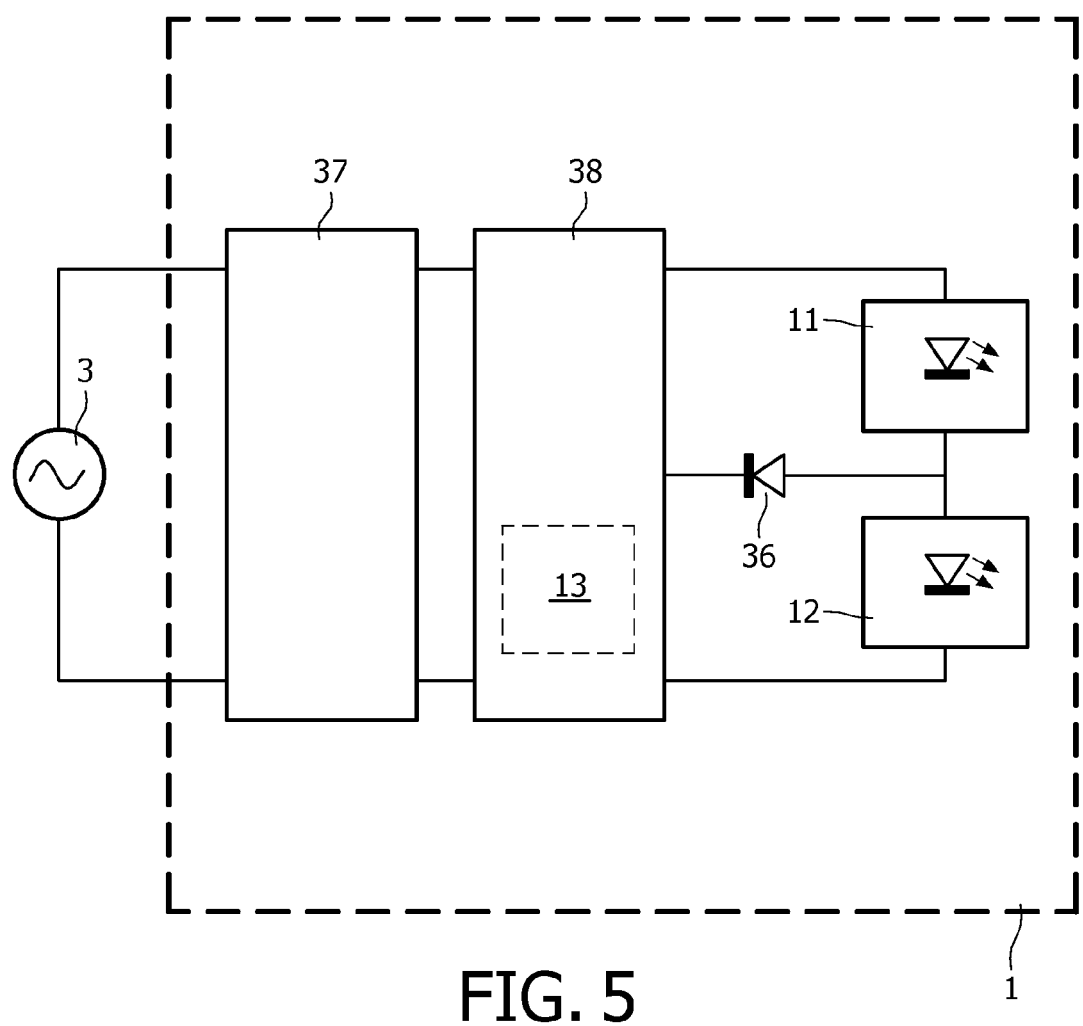
FIG. 5 shows a fifth light emitting diode circuit.

In the FIG. 5, a fifth light emitting diode circuit 1 is shown comprising a rectifying arrangement 37, a converter 38 and the first and the second circuit 11 and 12. Inputs of the rectifying arrangement 37 are coupled to outputs of an alternating current voltage source 3, outputs of the rectifying arrangement 37 are coupled to inputs of the converter 38, and outputs of the converter 38 are coupled to ending terminals of a serial connection of the first and the second circuit 11 and 12. Each one of the first and second circuits 11 and 12 comprises one or more light emitting diodes. An intermediate terminal between the first and the second circuit 11 and 12 is coupled via for example a diode 36 to the third circuit 13 that here forms part of the converter 38. Alternatively, this diode 36 may be shifted into the converter 38 and/or into the third circuit 13. Further alternatively, this diode 36 may be replaced by one or more other elements or a connection and/or may be extended with one or more other elements.

The voltage taken from the second circuit 12 is used to power the control of the converter 38, to replace more expensive and less efficient solutions used so far. The third circuit 13 forms part of the control of the converter 38, or this control forms part of the third circuit 13.

Each one of the first and second circuits 11 and 12 in the FIG. 5 may comprise any number of light emitting diodes in any kind of serial and/or parallel connection. In a minimum situation, only the first and the second circuit 11 and 12 will be present. A fourth circuit not shown etc. added to the first and the second circuit 11 and 12 as described before in any kind of serial and/or parallel connection is not to be excluded. The converter 38 may be any kind of converter.

In any embodiment, capacitors may be added for smoothing the direct current supply voltage from the direct current voltage source 2 and for smoothing the feeding voltage supplied from the second circuit 2 to the third circuit 3. The direct current voltage source 2 may be a battery etc. or may be a combination of an alternating current voltage source 3 and a rectifying arrangement 37 as shown in the FIG. 5.

Summarizing, in light emitting diode circuits 1 comprising serially coupled first and second circuits 11 and 12 with first and second light emitting diodes, third circuits 13 are coupled in parallel with the second circuits 12 for controlling the first light emitting diodes in the first circuits 11 and/or third light emitting diodes in fourth circuits 14. This allows more options, more optimizations, more flexibility and/or more efficiency. The light emitting diode circuit 1 receives a supply voltage from a source 2, 3 for feeding the light emitting diode circuit 1. The third circuit 13 receives a feeding voltage from the second circuit 12 for feeding the third circuit 13. The feeding voltage may be a voltage present across the second circuit 12. The third circuit 13 may further control the second light emitting diodes in the second circuit 12. Said controlling may comprise controlling a current flowing through said light emitting diodes for the purpose of dimming, flicker suppression, color control and/or temperature protection.

While the invention has been illustrated and described in detail in the drawings and foregoing description, such illustration and description are to be considered illustrative or exemplary and not restrictive; the invention is not limited to the disclosed embodiments. For example, it is possible to operate the invention in an embodiment wherein different parts of the different disclosed embodiments are combined into a new embodiment.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measures cannot be used to advantage. Any reference signs in the claims should not be construed as limiting the scope.

The invention claimed is:

1. A light emitting diode circuit comprising
  a first circuit comprising at least a first light emitting diode unit, a second circuit comprising at least a second light emitting diode unit, and a third circuit for controlling at least one light emitting diode unit different from the second light emitting diode unit, the third circuit being coupled in parallel with the second circuit, and the second circuit being coupled in series with the first circuit.

2. The light emitting diode circuit as defined in claim 1, the light emitting diode circuit being configured for receiving a supply voltage from a source for feeding the light emitting diode circuit, and the third circuit being configured for receiving a feeding voltage from the second circuit for feeding the third circuit.

3. The light emitting diode circuit as defined in claim 2, the feeding voltage being a voltage present across the second circuit.

4. The light emitting diode circuit as defined in claim 3, the third circuit comprising feeding terminals coupled to ending terminals of the second circuit.

5. The light emitting diode circuit as defined in claim 1, said at least one light emitting diode unit comprising said first light emitting diode unit and/or a third light emitting diode unit of a fourth circuit of the light emitting diode circuit.

6. The light emitting diode circuit as defined in claim 5, the third circuit being configured for further controlling at least the second light emitting diode unit.

7. The light emitting diode circuit as defined in claim 1, said controlling comprising controlling a current flowing through said at least one light emitting diode unit for the purpose of dimming, flicker suppression, color control and/or temperature protection.

8. The light emitting diode circuit as defined in claim 1, the third circuit comprising a transistor, an operational amplifier, a comparator, a sensor, analog circuitry, digital circuitry and/or a processor.

9. The light emitting diode circuit as defined in claim 1, the first circuit further comprising one or more further first light emitting diode units and/or one or more other units, and/or the second circuit further comprising one or more further second light emitting diode units and/or one or more other units, and/or the light emitting diode circuit further comprising one or more other units.

10. The light emitting diode circuit as defined in claim 1, with each one of the light emitting diode units comprising or forming part of anti-parallel light emitting diodes, the third circuit being coupled in parallel with the second circuit via a rectifying circuit, or one or more of the light emitting diode units each comprising or forming part of uni-directional light emitting diodes and the third circuit being coupled in parallel with the second circuit via a connection.

11. The light emitting diode circuit as defined in claim 1, the third circuit forming part of a converter for feeding the first and the second circuit.

12. The light emitting diode circuit as defined in claim 11, the third circuit forming part of a control of the converter, or this control forming part of the third circuit.

13. A device comprising the light emitting diode circuit as defined in claim 1.

* * * * *